(12) United States Patent
Hettich

(10) Patent No.: US 8,231,320 B2
(45) Date of Patent: Jul. 31, 2012

(54) COUNTERSUNK HEAD SCREW

(75) Inventor: Ulrich Hettich, Schramberg (DE)

(73) Assignee: Ludwig Hettich & Company, Schramberg-Sulgen (DE)

( * ) Notice: Subject to any disclaimer, the term of this patent is extended or adjusted under 35 U.S.C. 154(b) by 700 days.

(21) Appl. No.: 12/292,316

(22) Filed: Nov. 17, 2008

(65) Prior Publication Data

US 2009/0123253 A1    May 14, 2009

(30) Foreign Application Priority Data

May 19, 2006   (DE) .......................... 10 2006 023 708

(51) Int. Cl.
   *F16B 35/06*   (2006.01)
(52) U.S. Cl. ...................................... 411/399
(58) Field of Classification Search ............ 411/399, 411/187, 188
   See application file for complete search history.

(56) References Cited

U.S. PATENT DOCUMENTS

| 29,963 | A | * | 9/1860 | Freeman | 411/399 |
| 213,551 | A | * | 3/1879 | Doten | 411/399 |
| 378,614 | A | * | 2/1888 | Palmer | 411/399 |
| 466,463 | A | * | 1/1892 | Holland | 411/399 |
| 1,238,636 | A | * | 8/1917 | Christofferson | 411/399 |
| 3,903,784 | A | | 9/1975 | Dekker | |
| RE36,741 | E | * | 6/2000 | Walther et al. | 411/399 |
| 6,558,097 | B2 | * | 5/2003 | Mallet et al. | 411/399 |

FOREIGN PATENT DOCUMENTS

| DE | 1887998 | | 2/1964 |
| DE | 7634720 | U1 | 4/1978 |
| DE | 3344048 | A1 | 6/1984 |
| DE | 3334212 | A1 | 4/1985 |
| GB | 24725 | | 0/1913 |
| GB | 140953 | | 4/1920 |
| GB | 2227540 | A | 8/1990 |
| GB | 2382854 | A | 6/2003 |
| WO | 9917908 | A1 | 4/1999 |

OTHER PUBLICATIONS

European Patent Office, International Search Report and Written Opinion in related International Application No. PCT/EP2007/003499, mailed Jul. 25, 2007, p. 1-6.

* cited by examiner

*Primary Examiner* — Flemming Saether
(74) *Attorney, Agent, or Firm* — Duane Morris, LLP

(57) ABSTRACT

The invention relates to a countersunk head screw comprising a cylindrical shaft (2) and an essentially conical countersunk head (4) comprising at least two edges (15) on the lower side. Said countersunk head screw is characterized in that the edges each mark an end of a partial surface (10) located on the lower side, each of the partial surfaces lying on a non-concave separate surface of revolution.

21 Claims, 4 Drawing Sheets

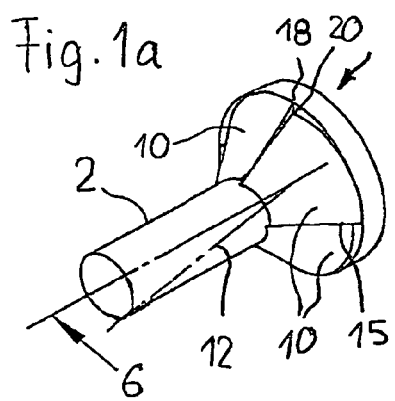
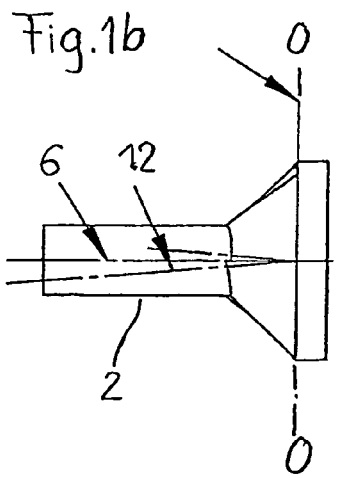
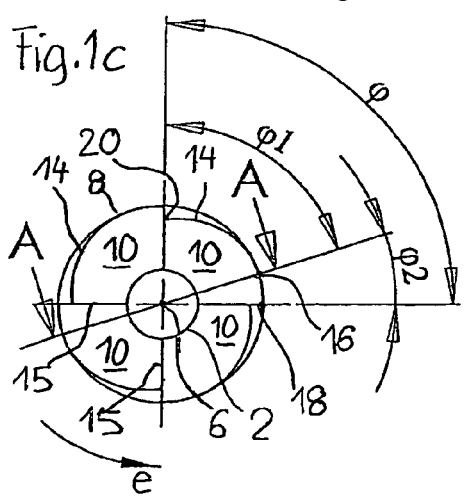
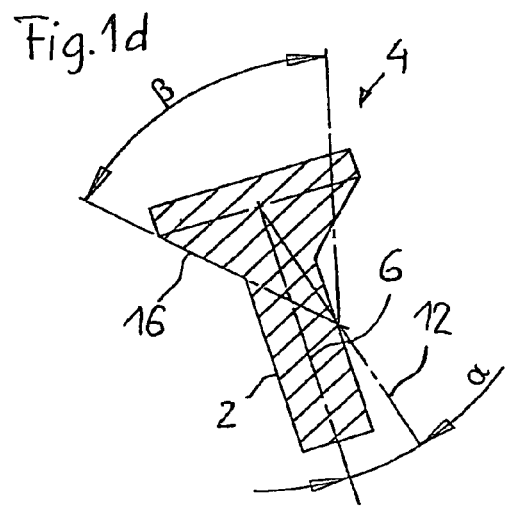
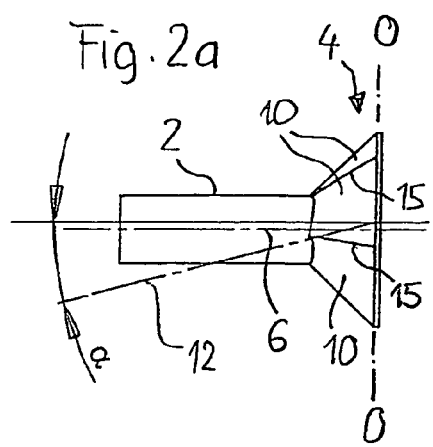
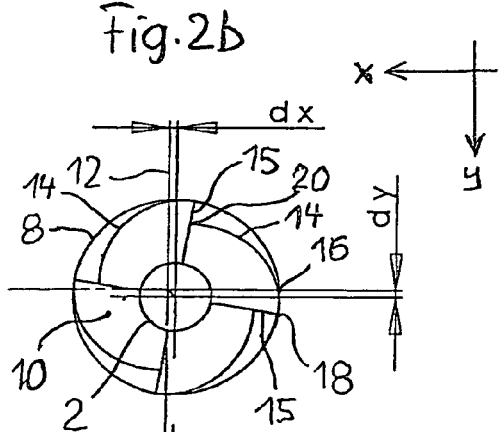
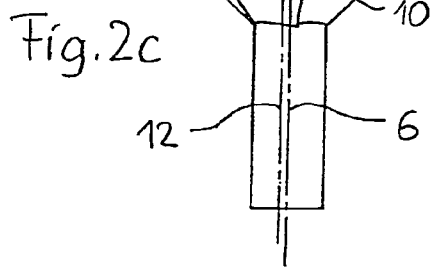

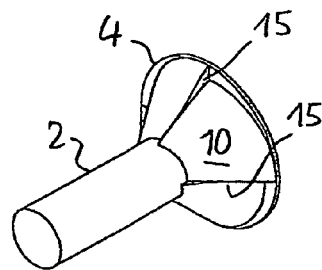
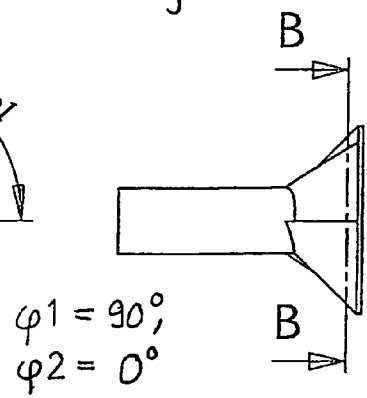
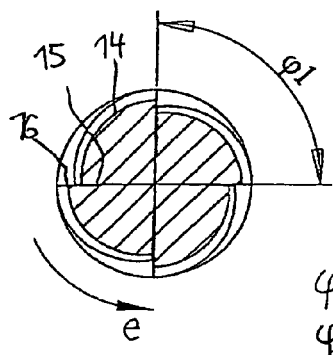
$\varphi1 = 90°,$
$\varphi2 = 0°$
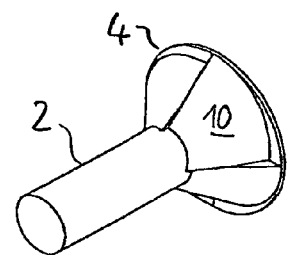
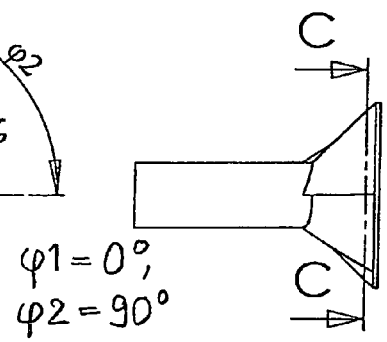
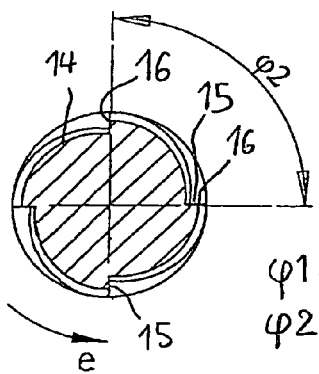
$\varphi1 = 0°,$
$\varphi2 = 90°$
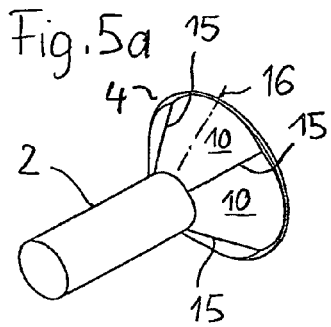
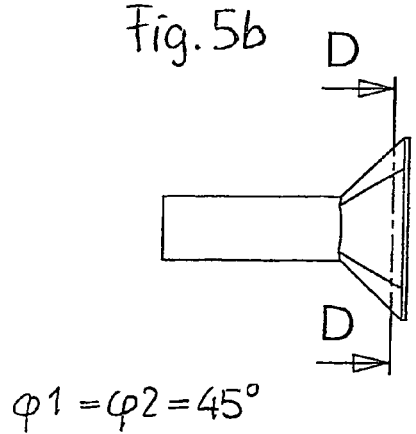
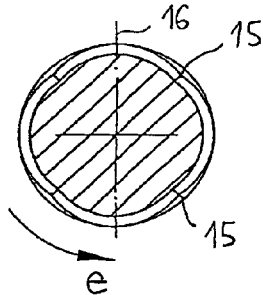
$\varphi1 = \varphi2 = 45°$

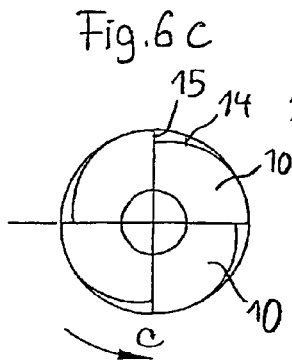
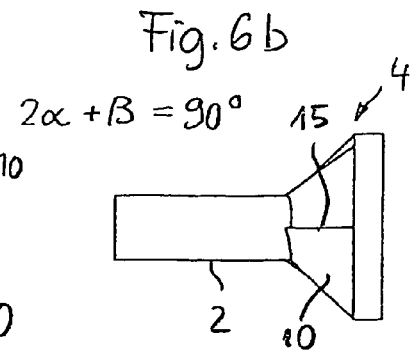
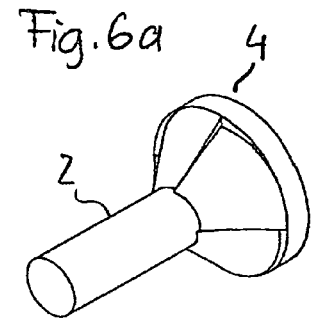
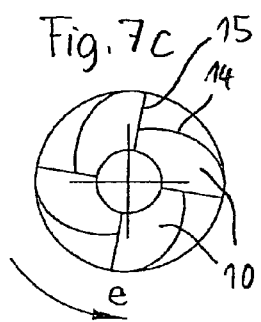
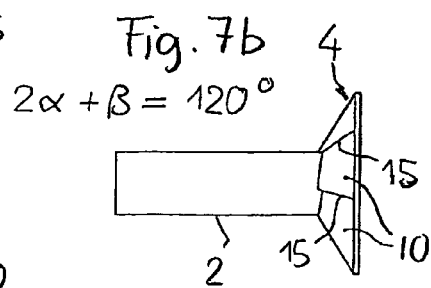
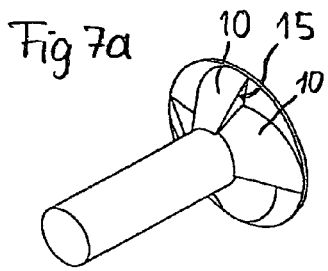
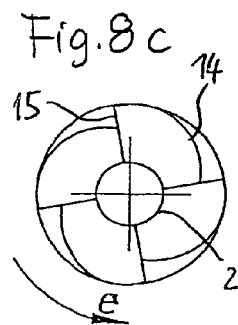
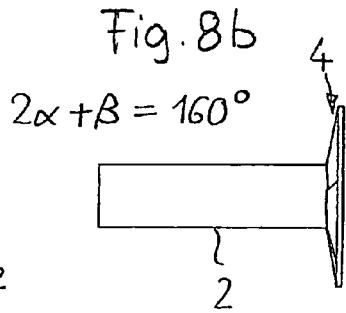
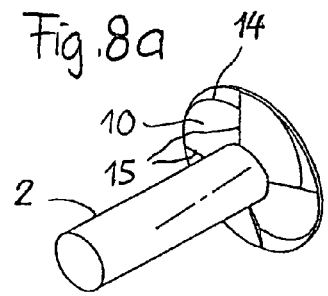
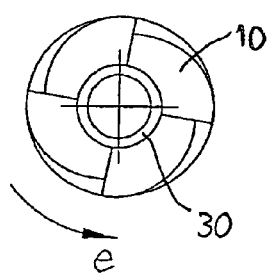
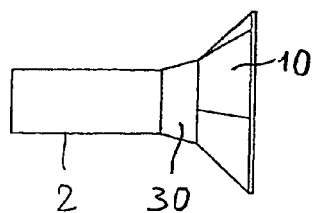
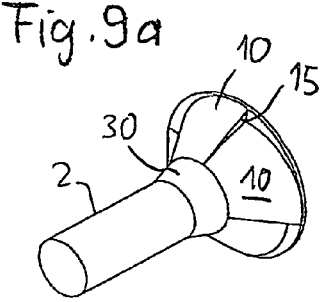

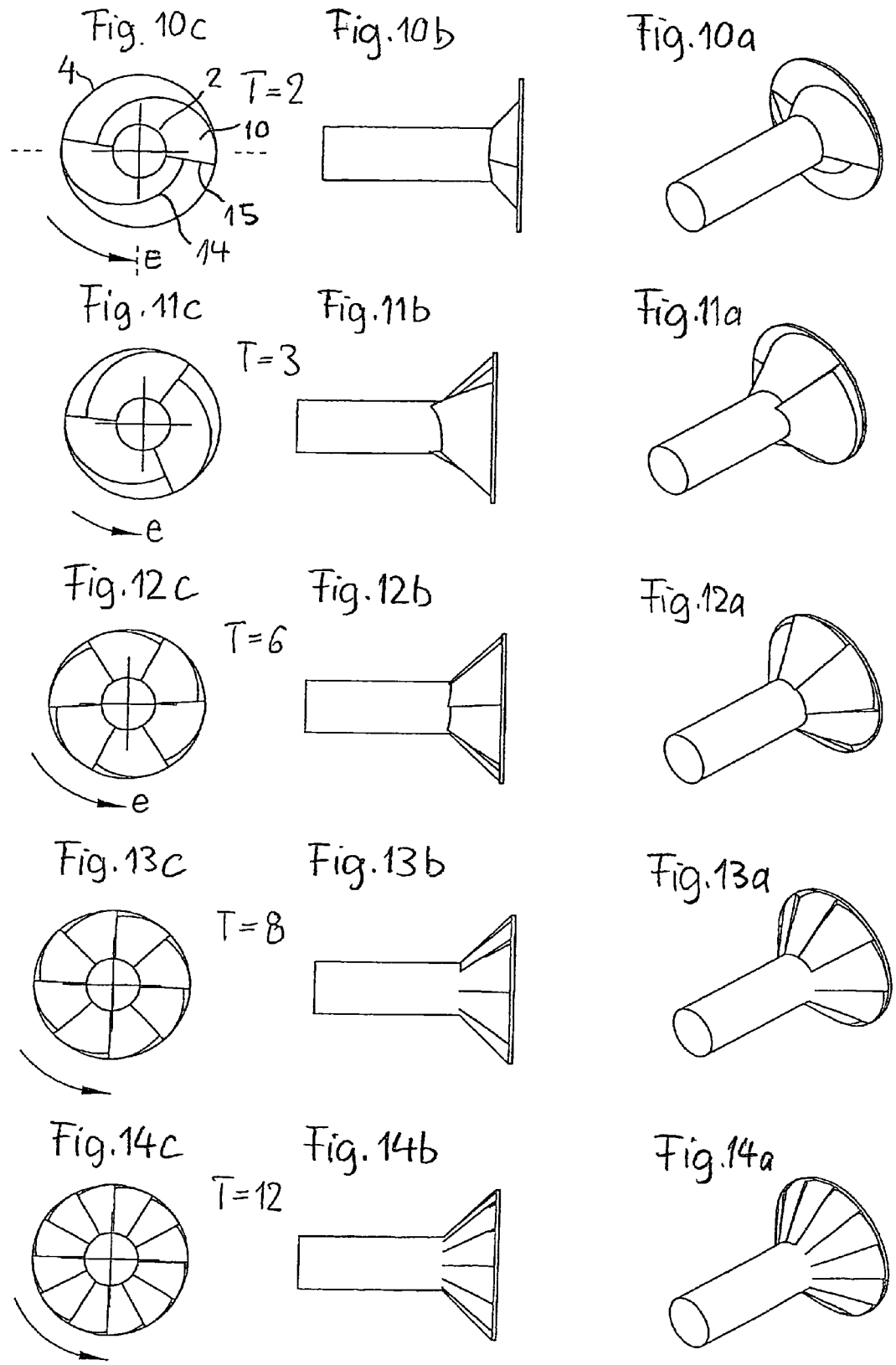

COUNTERSUNK HEAD SCREW

RELATED APPLICATIONS

The instant application claims the priority benefit of PCT Patent Application No. PCT/EP 2007/003499 filed on Apr. 20, 2007, which along with the instant application claims the priority benefit of German Patent Application No. 10 2006 023 708.0 filed on May 19, 2006, the entirety of each are hereby incorporated by reference.

The invention relates to a countersunk head screw comprising a cylindrical shaft and an essentially conical countersunk head comprising at least two edges on the lower side.

A known countersunk head screw of this type (DE 33 34 212 A1) comprises, on the lower side of the countersunk head, grooves extending from the shaft to the cylindrical lateral surface directly below the front surface of the screw head. The grooves have a depth increasing in the opposite direction of rotation of the screw and form a cutting edge at the deepest location of each bottom of the groove. The grooves are recessed with a concave curve from the screw head, which requires a heavy material displacement by means of stamping during manufacturing. Due to the geometry of the grooves, material needs to be removed specifically in the area behind the cutting edge, which is disadvantageous for the support of the cutting loads, and limits the durability of the cutting edge.

For the known screw, a cutting effect is intended to be used for cutting or milling of a countersunk hole into the material to be fastened by means of the screw, e.g. into wood. However, when using a countersunk head screw for fastening of metal parts, a locking effect for securing against loosening instead of a cutting effect would be advantageous.

The mentioned cutting edges and the associated grooves are to be provided negative on the stamping tools which are typically made of steel. Such tools, however, have a very short service life and are hence suitable to only a limited extent for a cost-efficient production. Carbide tools have indeed a high service life but are complicated to machine, such as, for example, by eroding, or with other complex metal-cutting methods.

The geometry of the countersunk head also has a strong influence on the service life of the tools because the edges have a tendency for wear and break-outs. In the region of the edges, due to the geometry, high notch stresses with stress peaks can be generated, which reduces the service life.

Also known is a countersunk head screw with the features of the preamble of claim 1 (GB 2 227 540A), with two or four cutting edges located on a conical surface of rotation on the lower side of the screw head, wherein the surface of rotation has an axis which coincides with the axis of the shaft.

It is the object of the invention to form a countersunk head screw of the described type such that it can be manufactured cost-efficiently, wherein early wear of the forming tools can be avoided due to the geometry of the countersunk head screw, and, depending on the application of the countersunk screw, a cutting effect or a locking effect is to be generated without change of the geometry.

Advantageous embodiments of the invention are described herein.

Due to the stressed geometry of the lower side of the countersunk head, a carbide tool for a high volume production of the countersunk head screw can be manufactured in a comparatively simple manner, in particular by grinding, which results in high tool life. With this, breaking-out or wearing of edges due to the stressed geometry is avoided to a large extent.

The invention is explained hereinafter more clearly with further details by means of schematic drawings of exemplary embodiments. In the figures:

FIG. 1 shows a screw comprising four conical partial surfaces on the lower side of the head, and shows in particular:

FIG. 1a a perspective view from the lower side;
FIG. 1b a side view;
FIG. 1c a bottom view;
FIG. 1d a section along the line A-A in FIG. 1c;

FIG. 2 shows a countersunk screw similar to FIG. 1, but with the positions of the axis of shaft and the conical partial surfaces changed relative to one another, and shows in particular:

FIG. 2a a side view;
FIG. 2b a bottom view
FIG. 2c a side view rotated by 90° with regard to FIG. 2a;

FIG. 3 shows a countersunk head screw according to the invention having a locking effect against loosening, and shows in particular:

FIG. 3a a perspective illustration from below;
FIG. 3b a side view;
FIG. 3c a section along the line B-B in FIG. 3b;

FIG. 4 shows a countersunk head screw having a cutting effect, and shows in particular:

FIG. 4a a perspective view;
FIG. 4b a side view;
FIG. 4c a section along the line C-C in FIG. 4b;

FIG. 5 shows a countersunk head screw according to the invention having a deforming effect, and shows in particular:

FIG. 5a a perspective illustration from below;
FIG. 5b a side view; and
FIG. 5c a section along the line D-D in FIG. 5b.

Also in each of the following figures, "a" represents the perspective illustration from below, "b" the side view, and "c" a bottom view of the countersunk head screw, which is not individually mentioned again to avoid repeats. Thus in the figures:

FIG. 6 shows a countersunk head screw according to the invention for which the relationship $2*\alpha+\beta=90°$ applies;

FIG. 7 shows a countersunk head screw according to the invention for which the relationship $2*\alpha+\beta=120°$ applies; and FIG. 8 shows a countersunk head screw according to the invention, for which the relationship $2*\alpha+\beta=160°$ applies, wherein $\alpha$ is the inclination angle of the surface of rotation, and $\beta$ is the cone angle of this surface of rotation according to FIG. 1d;

FIG. 9 shows a countersunk head screw according to the invention similar to FIG. 6 but with an angular surface at the transition between shaft and countersunk head;

FIG. 10 to 14 show countersunk head screws with 2, 3, 6, 8, and 12 partial surfaces, respectively.

FIG. 1 shows a first embodiment of a countersunk head screw according to the invention comprising a shaft 2 and a countersunk head 4, which, as a blank, has an "imaginary" conical surface which has an axis which is common with the shaft axis 6. The basis of this conical surface appears in FIG. 1c as basis circle 8. On the lower side of the countersunk head 4, a total of four conical partial surfaces 10 are formed, wherein each partial surface is located on a separate cone envelope surface. In the FIGS. 1a, 1b, and 1d, only for one of these partial surfaces 10, an associated cone axis 12 is drawn which is inclined to the shaft axis 6 by and angle $\alpha$. The angle $\alpha$ can be in the range $0 \leq \alpha \leq 15°$ or $25° \leq \alpha \leq 35°$.

The associated cone envelope surface has a cone angle $\beta$, which can be in the range $0 \leq \beta \leq 180°$. For the cone angle $\beta$ and the inclination angle $\alpha$, the relationship $2*\alpha+\beta<180°$ applies, wherein the cone angle β is 60° here, and the angle α is 15° here.

In the bottom view according to FIG. 1c, the bases of the partial surfaces are represented as elliptical arches 14, each of them abutting with two ends 18, 20 the two bordering edges 15 of each partial surface. The totaling four edges 15 each mark the approximately radial borders of each partial surface 10. The ellipse denoted by 14 in FIG. 1c has a vertex 16 in the section plane A-A, and there a common tangent with the basis circle 8 of the "imaginary" conical surface. Beginning from this vertex 16, thus the partial surface 10 is, in a counterclockwise direction, gradually radially curved inwards in circumferential direction (angle φ1), and also in the clockwise direction (angle φ2) so that the one end 18 of each elliptical arch 14 is located slightly outside of the basis circle 8, while the other end 20 of the elliptical arch 14 abuts clearly radially inside of the basis circle 8 against the edge 15. The edges 18 and 20 each mark the two ends of each partial surface 10.

The vertex 16 according to FIG. 1c appears in FIG. 1d as a surface line which is common for the imaginary conical surface with basis circle 8 and the partial surface 10. The total angle between the two ends 18 and 20 of the elliptical arch 14 is denoted by φ. φ1 denotes the big angle between the edge 20 located radially further towards the inside and the surface line or the vertex 16, while φ2 denotes the angle between the vertex or the surface line 16 and the edge 18 located further towards the outside.

The screw-in direction is denoted in FIG. 1c by the arrow e (right-hand rotation when viewed from the screw head). It is apparent that a locking effect is generated at screwing-out of the screw along the surface line 16.

Also for the countersunk head screw according to FIGS. 2a and 2b, four partial surfaces 10 are provided on the lower side of the countersunk head 4, wherein the distribution of the partial surfaces 10 around the circumference of the countersunk head 4 is identical as in FIG. 1c. Different to the configuration according to FIG. 1 is the arrangement of the cone axes 12 of each partial surface 10. While in FIG. 1 the cone axes 12 intersect in particular the shaft axis 6 in the region of the plane 0-0 (FIG. 1b), this does not apply for the cone axes 12 in FIG. 2. In fact, the cone axes 12 break through the plane 0-0 (drawing plane of FIG. 2b) with an offset dx and dy in a x-y coordinate system so that a corresponding position change of the partial surfaces 10 occurs. This offset allows an influence of the edge length 15.

The conical partial surfaces 10 can be arranged rotated with respect to the plane A-A in circumferential direction such that the vertices 16 coincide with the edges 15. Then φ1=90° and φ2=0° (FIG. 3), and in a mirror-inverted arrangement is φ1=0° and φ2=90° (FIG. 4).

The countersunk head screw according to FIG. 3 has a locking effect against loosening, wherein the vertices 16 of the elliptical arches coinciding with the edges 15 develop the highest resistance. On the other hand, in case of the countersunk head screw according to FIG. 4c, the edges 15 which coincide with the vertices 16 of the elliptical arches 14 as well, have a cutting effect at screwing-in of the screw in direction of the rotation arrow e.

On the countersunk head screw according to FIG. 5, the conical partial surfaces 10 are distributed over the circumference such that the vertex surface lines 16 are located offset exactly by 45° to the two edges 15 bordering the partial surfaces 10. At these vertices 16, the countersunk head 4 generates a deformation effect on the material of the component to be fastened.

In the FIGS. 6 to 8, three countersunk head screws, each with four partial surfaces 10, are shown again, wherein, however, different angular sums are used for the relationship 2α+β. Thus, in FIG. 6, 2α+β=90°; the partial surfaces are arranged such that a locking effect is generated by the countersunk head.

This applies to the countersunk head screw of FIG. 7 as well, wherein, however, 2α+β=120°.

In case of the countersunk head screw according to FIG. 8, the edges 15 generate a cutting effect during screwing-in the screw in the direction of the rotation arrow e. Here, 2α+β=160° applies for the angles.

As the FIGS. 6b, 7b, and 8b illustrate in a comparison, the countersunk head becomes flatter with increasing angular sum 2α+β, which indeed can make sense as an adaption to the respective application of the countersunk head screw.

The screw according to FIG. 9 is similar to the one of FIG. 6 but with the difference that between the conical partial surfaces 10 and the shaft 2, a transition area in the form of a conical angular surface or chamfer 30 is provided. This screw generates a locking effect against unintended loosening as well.

In the embodiments according to FIGS. 10 to 14, the number of partial surfaces or the partition T is varied between T=2 according to FIG. 10 and T=12 according to FIG. 14.

The FIGS. 10 to 14 show clearly how the shape of the countersunk head changes by means of this varying. All partial surfaces have the same size and are uniformly distributed around the circumference of the countersunk head. A partition T=24 is definitely manufacturable and is indeed useful for a suitable application.

It is to be pointed out that the partial surfaces of the countersunk head screws according to the FIGS. 10 to 12 are arranged such that the edges 15 achieve a cutting effect, while for the countersunk head screws according to the FIGS. 13 and 14, the partial surfaces 10 are arranged such that a locking effect is achieved.

The features disclosed in the above description, the claims, and the drawings can be of significance individually as well as in any combination for the implementation of the invention in its different embodiments.

The invention claimed is:

1. A countersunk head screw comprising a cylindrical shaft (2) and an essentially conical countersunk head (4) comprising at least two edges (15) on the lower side, wherein the edges (15) each mark an end of a partial surface (10) located on the lower side, each of the partial surfaces lying on a non-concave surface of rotation, characterised in that each partial surface (10) has a separate axis (12) which does not coincide with the shaft axis (6), and which is inclined with respect to the shaft axis at an inclination angle α; wherein an arc defined by an intersection of the partial surface with a plane normal to the shaft axis is not circular in nature.

2. The countersunk head screw according to claim 1, characterised in that each surface of rotation is a cone envelope surface forming the partial surface (10).

3. The countersunk head screw according to claim 1, characterised in that the cone angle β of the partial surfaces (10) is β≦180°.

4. The countersunk head screw according to claim 1, characterised in that the inclination angle α is in the range 0<α≦15° or 25°≦α≦35°.

5. The countersunk head screw according to claim 1, characterised in that the axes (12) of the conical partial surfaces (10) do not intersect with the shaft axis (6).

6. The countersunk head screw according to claim 5, characterised in that for the cone angle β and the inclination angle α, the relationship $2*α+β<180°$ applies.

7. The countersunk head screw according to claim 6, characterised in that $90°≦2*α+β≦160°$.

8. The countersunk head screw according to claim 6, characterised in that $2*α+β≅120°$.

9. The countersunk head screw according to claim 1, characterised in that the transition of the partial surfaces (10) from the countersunk head (4) to the shaft (2) is formed by an angular surface (30).

10. The countersunk head screw according to claim 1, characterised in that each conical partial surface (10) has a common surface line (16) with an imaginary surface of rotation, which has an axis which is common with the shaft axis (6), and that beginning from this surface line (16), each partial surface (10), with respect to the imaginary surface of rotation, is gradually radially curved inwards in circumferential direction.

11. The countersunk head screw according to claim 10, characterised in that the surface of rotation is a conical surface, wherein the common surface line (16) lies in an axial section plane A-A containing the shaft axis.

12. The countersunk head screw according to claim 10, characterised in that the common surface line (16) coincides with one of the two approximately radial edges (15) of the respective partial surface (10), or is located between these edges (15).

13. The countersunk head screw according to claim 10, characterised in that the common surface line (16) in a right-hand configuration forms a leading cutting edge (15) of the respective partial surface (10).

14. The countersunk head screw according to claim 10, characterised in that the common surface line (16) in a left-hand configuration forms a trailing locking edge (15) of the respective partial surface (10).

15. The countersunk head screw according to claim 1, characterised in that the partial surfaces (10) are uniformly distributed in a number of $2≦T≦24$ around the circumference of the countersunk head (4) wherein T is the number of partial surfaces.

16. The countersunk head screw according to claim 15, characterised in that the number T of the partial surfaces is 2, 3, 4, 6, 8, 12, or 24.

17. A countersunk head screw comprising a cylindrical shaft (2) and an essentially conical countersunk head (4) comprising at least two edges (15) on the lower side, wherein the edges (15) each mark an end of a partial surface (10) located on the lower side, each of the partial surfaces lying on a non-concave surface of rotation, characterised in that each partial surface (10) has a separate axis (12) which does not coincide with the shaft axis (6), and which is inclined with respect to the shaft axis at an inclination angle α; wherein each surface of rotation is a cone envelope surface forming the partial surface (10); the cone angle β of the partial surfaces (10) is $β≦180°$ and the inclination angle α is in the range $0<α≦15°$ or $25°≦α≦35°$; wherein an arc defined by an intersection of the partial surface with a plane normal to the shaft axis is not circular in nature.

18. The countersunk head screw according to claim 17, characterised in that the transition of the partial surfaces (10) from the countersunk head (4) to the shaft (2) is formed by an angular surface (30).

19. The countersunk head screw according to claim 17, characterised in that in that each conical partial surface (10) has a common surface line (16) with an imaginary surface of rotation, which has an axis which is common with the shaft axis (6), and that beginning from this surface line (16), each partial surface (10), with respect to the imaginary surface of rotation, is gradually radially curved inwards in circumferential direction.

20. A countersunk head screw comprising a cylindrical shaft (2) and an essentially conical countersunk head (4) comprising at least two edges (15) on the lower side of the countersunk head, wherein the edges (15) each mark an end of a partial surface (10) located on the lower side, each of the partial surfaces lying on a non-concave surface of rotation, characterised in that each partial surface (10) is defined by a separate axis (12) and wherein the separate axis (12) does not coincide with the shaft axis (6), and which is inclined with respect to the shaft axis at an inclination angle α; wherein an arc defined by an intersection of the partial surface with a plane normal to the shaft axis is not circular in nature.

21. The countersunk head screw according to claim 20 wherein in each surface of rotation is a cone envelope surface forming the partial surface (10), the cone angle β of the partial surfaces (10) is $β≦180°$ and the inclination angle α is in the range $0<α≦15°$ or $25°≦α≦35°$.

\* \* \* \* \*